No. 672,308. Patented Apr. 16, 1901.
C. BRISTOW.
SEED SOWING MACHINE.
(Application filed Apr. 14, 1900.)
(No Model.) 2 Sheets—Sheet 1.
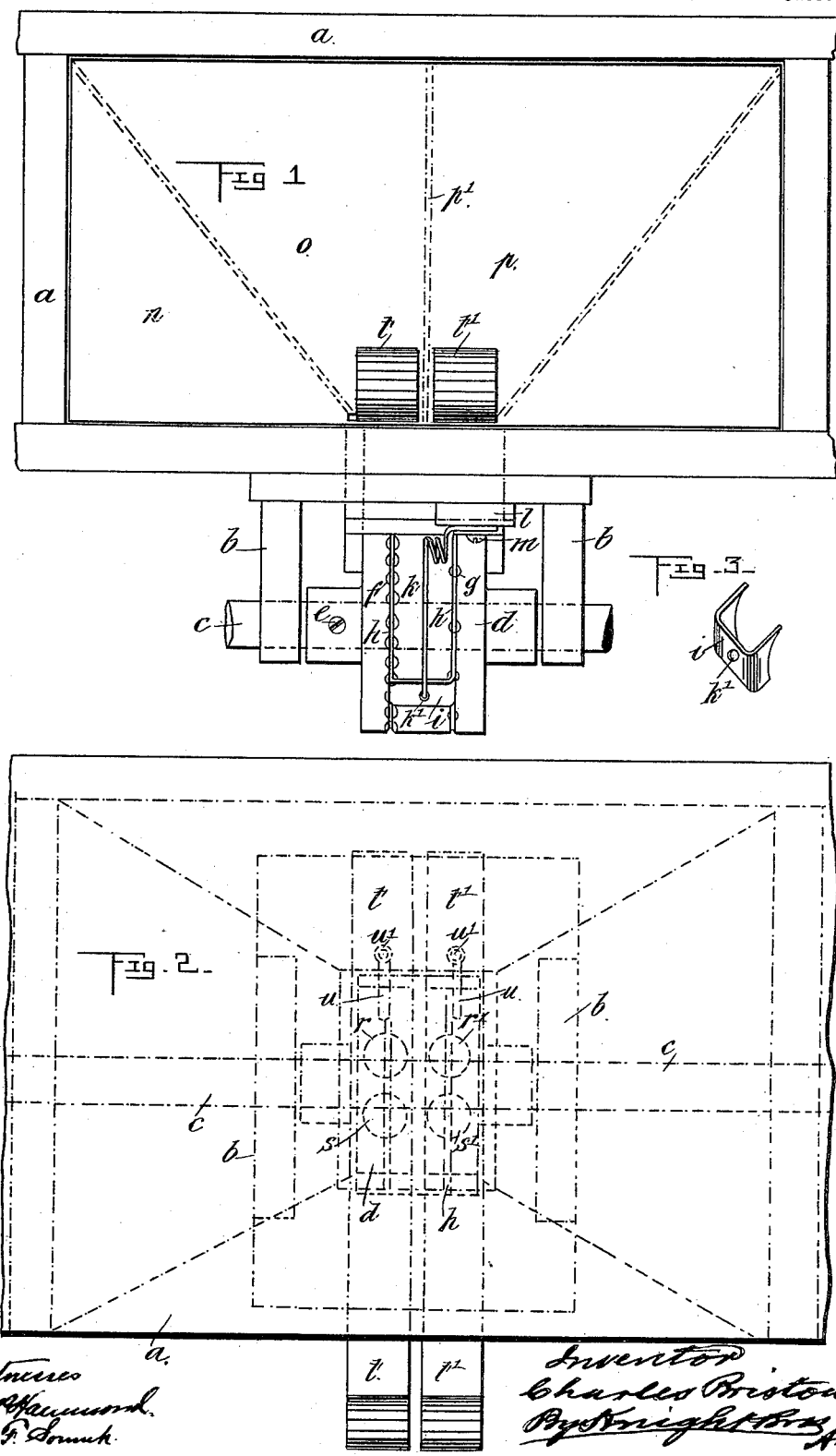

No. 672,308. Patented Apr. 16, 1901.
C. BRISTOW.
SEED SOWING MACHINE.
(Application filed Apr. 14, 1900.)
(No Model.) 2 Sheets—Sheet 2.
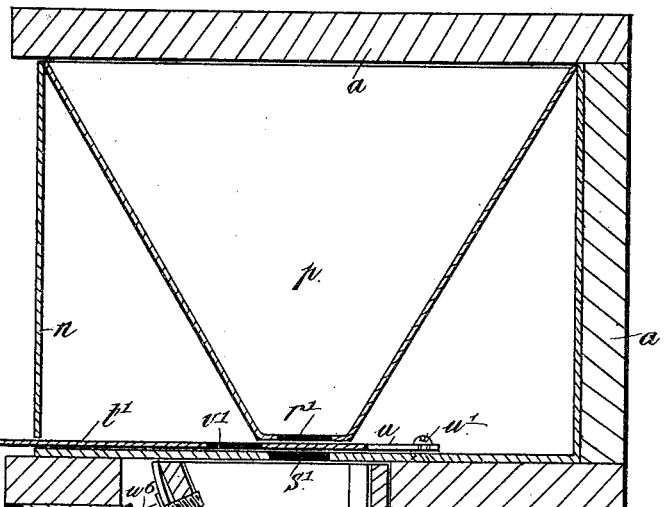
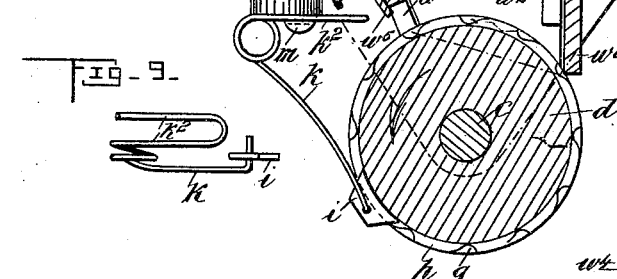
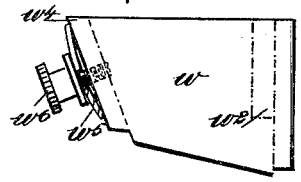
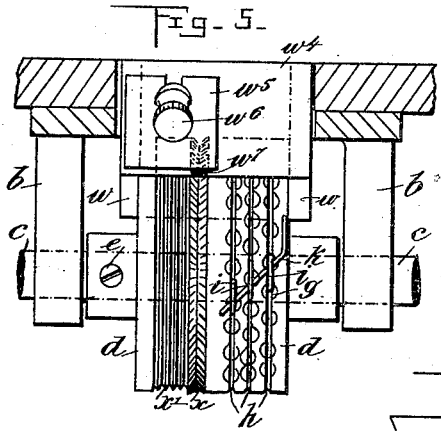
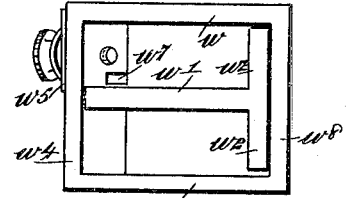
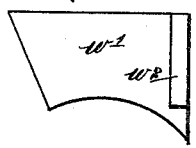
Witnesses
W. P. Hammond
P. F. Sonnek
Inventor
Charles Bristow
By Knight Bros
Attys.

UNITED STATES PATENT OFFICE.

CHARLES BRISTOW, OF MARTON, NEW ZEALAND, ASSIGNOR TO THE NEW ZEALAND LOAN AND MERCANTILE AGENCY COMPANY, LIMITED, OF WELLINGTON, NEW ZEALAND.

SEED-SOWING MACHINE.

SPECIFICATION forming part of Letters Patent No. 672,308, dated April 16, 1901.

Application filed April 14, 1900. Serial No. 12,816. (No model.)

*To all whom it may concern:*

Be it known that I, CHARLES BRISTOW, a subject of the Queen of Great Britain, residing at Marton, in the provincial district of Wellington, in the Colony of New Zealand, have invented new and useful Improvements in Seed-Sowing Apparatus; and I do hereby declare the following to be a full, clear, and exact description of the same.

This invention provides improved apparatus whereby agricultural seeds—such as rape, turnip, pea, and the like—are delivered a number at a time or singly at any desired distance apart. Seeds of different size and a different quantity of either may be sown simultaneously or either of them independently of the other.

The invention consists of a drum or roller having a number of holes or indentations each of a size to receive one or more of the seeds to be sown arranged in a ring or series of rings upon its circumferential periphery. The roller is caused to revolve beneath a hopper, wherefrom each hole receives a seed and carries it until it falls out by gravitation or is ejected by an ejector. The ejector is in the form of a blade or blades and fits within a groove or grooves circumferentially in the roller and passing through the holes. When a large quantity of seed is to be sown in a continuous stream, the holes or indentations are omitted and the groove is made wider, and its surface may be roughened by milling or otherwise to cause the seed to be carried therein until it falls out by gravity.

The accompanying drawings illustrate apparatus according to my invention whereby two kinds and quantities of seed are sown simultaneously or either of them separately.

Similar letters of reference indicate the same parts throughout the figures, wherein—

Figure 1 is a front elevation, Fig. 2 a plan, and Fig. 3 a perspective view, of an ejector; Fig. 4, an end sectional elevation, and Fig. 5 a front sectional elevation, of part of my apparatus; Figs. 6 and 7, a side elevation and a plan, respectively, of a riding hopper; Fig. 8, a side elevation of a dividing-plate; Fig. 9, an inverted plan of an ejector and spring, and Fig. 10 an end perspective view of a partition-bracket.

The apparatus may be used in connection with a small seed-sowing machine or may be arranged in series upon an ordinary agricultural drill.

The hopper-box $a$ (shown more particularly in Figs. 1, 2, and 4) has fixed beneath it the bearing-bracket $b$, in which is journaled a spindle $c$. Spindle $c$ is caused to revolve in the direction of the arrow, Fig. 4, by chain-and-sprocket or other ordinary gearing from a land or traveling wheel or the axle of the implement upon which the apparatus is employed, said gear being variable by any ordinary means, whereby the speed of revolution of said spindle in relation to the traveling wheels of the implement may be adjusted as required. The roller $d$ is secured to the spindle $c$ between the ears of the bracket $b$ by a set-pin $e$.

Figs. 1 and 5 illustrate two modes of adapting the roller to sow different kinds and quantities of seed independently or simultaneously.

Referring first more particularly to Figs. 1 and 2, the roller $d$ is provided with two sets of seed holes or indentations $f\,g$, arranged in continuous circumferential rings. The holes $f$ are larger and more numerous than the holes $g$ for the purpose of sowing a larger quantity of seed of a larger size. Grooves $h$, equal in depth to the holes, circumscribe roller $d$, passing through the holes $f\,g$, respectively. The grooves $h$ each receive a member of the ejector-plate $i$, (shown in detail in Fig. 3,) which is held in position by wire spring $k$, passing through a hole $k'$ in the ejector at one end and secured at the other end, which is bent into U shape, (see Fig. 9,) between a boss $l$, cast upon bracket $b$, and the head of a clamping-screw $m$, screwed into said boss. The face of each member of the ejector is formed to fit the radius of the bottom of the groove in the roller on which it works, and each member is made wedge-shaped at one end, whereby its point passes beneath the seed (or other foreign matter) and pushes it out of the hole in which it is contained.

Fig. 9 shows an ejector consisting of a single plate for a single row of holes and will be readily understood from the foregoing description.

The pressure of the ejector upon the roller can be adjusted by slackening the clamping-screw $m$ and pushing the U-shaped end $k^2$ of the spring $k$ either in or out, as required.

The seed-holes are slightly channeled out upon one side, as shown clearly in Fig. 4, to facilitate the discharge of the seed.

Within the hopper-box $a$ is a drawer $n$, containing a seed-hopper divided into two compartments $o\ p$ by a transverse dividing-plate $p'$. Each compartment contains one of the kinds of seed to be sown, and the sides are inclined to conduct the seed toward discharge-holes $r\ r'$, one of which is at the bottom of each compartment, in correspondence with similar holes $s\ s'$, formed in the bottom of the drawer.

Between the bottoms of the seed-hoppers and the bottom of the drawer (see more particularly Figs. 2 and 4) are sliding shutters $t\ t'$, each guided by a slot $u$, through which passes a guide-pin $u'$, secured to the bottom of the drawer. The shutters have each a hole $v\ v'$, which when a shutter is pushed in to its full extent comes into correspondence with the hole in the hopper-compartment and the hole in the drawer and allows the passage of seed. It will be seen that either of the holes in the hopper for egress of seed may be open independently of the other or both of them together.

A riding hopper or box-formed gravitating scraper $w$ (shown in detail, Figs. 6 and 7) fits within a hole in bracket $b$ and rides upon the roller $d$. It is divided into two compartments, each receiving seed from one of the hoppers $o$ and $p$ by the dividing-plate $w'$, (shown particularly in Figs. 7 and 8,) which is formed to fit transversely across the hopper and to ride upon the roller $d$ between the two sets of seed-holes, ears $w^2$ upon the plate maintaining it in position longitudinally with the roller. The sides $w$ of the riding hopper project over the ends of the roller to guide the hopper laterally and to prevent seed from falling out. The side $w^4$ of the riding hopper has a sliding shutter $w^5$, which is adjustable vertically and clamped in position by a milled-head set-screw $w^6$, screwing into the hopper. The shutter is slightly curved to assist the screw in holding it in position and is designed to adjust the size of and consequent quantity of seed passing through a vertical slot $w^7$ in the side $w^4$ of the hopper.

As this device is more particularly for sowing a large quantity of seed in a continuous stream, I will now describe my arrangement therefor, referring to Fig. 5, wherein a continuous groove $x$ is substituted for a ring of holes, the groove being roughened by a milling-tool to insure the carrying of the seed. The groove also operates without having a roughened surface. To assist in filling the groove with seed, a channel $x'$ in the form of a screw-thread is cut upon the roller, the thread leading the seed into the groove $x$ as the roller revolves. The opening $w^7$ in the side $w^4$ of the hopper corresponds in position with the groove $x$. An ordinary single-thread screw-channel is shown in the drawings; but multiple screw-channels may be used and, if desired, screw-channels upon both sides of the groove, the channels terminating at different positions in the groove. Also in Fig. 5 three rings of holes are shown for sowing one kind of seed, the holes being arranged at an angle to each other, so that the flow of seed is intermittent. It is obvious that the holes may be connected diagonally or otherwise to form grooves. Three ejectors are used upon one spring, the ejectors being arranged with their front edges at an angle slightly greater or less than the angle at which the holes are arranged, whereby the seeds are ejected in succession at correct intervals of time.

Fig. 10 shows a partition-bracket $y$, shaped to fit within the hopper and to ride upon the roller. It may be used to cover up a row or rows of holes when a reduced quantity of seed is to be sown. Flanges $y'$ fit into recesses which, if the bracket is employed, are formed for their reception at the upper inside edges of the sides $w^4$ and $w^8$ of the hopper, in position which will maintain the bracket in place to cover the desired ring or rings of holes.

The quantity of seed sown depends upon the number of holes in the roller and the speed with which it is revolved, and it is obvious that there may be any number of rings of holes, indentations, or diagonal grooves in the roller, the holes, indentations, or diagonal grooves being arranged in any position in regard to each other, so that a number of seeds may be sown simultaneously or one after the other.

Having now described my invention, I declare that what I desire to secure by Letters Patent is—

1. The combination of the main hopper-box $a$, containing a suitable hopper $n$, the revoluble roller $d$ having feed cavities or indentations around its periphery and the separate riding hopper $w$ resting on the roller $d$ and receiving seed from the hopper $n$ and delivering it to the said roller as described.

2. The combination of a suitable hopper, the revoluble roller $d$ having circumferential grooves in its periphery and the ejectors formed of wedge-shaped plates $i$ having inner faces curved concentrically with the bottoms of the grooves on which they rest, and the spring $k$ holding the ejector-plates with elastic pressure in the grooves and attached adjustably to the frame, substantially as set forth.

3. The combination of the hopper-box $a$, hopper $n$, divided into compartments, $o$, $p$, the revoluble roller $d$ having a plurality of circumferential grooves or ranges of indentations corresponding in number to the compartments in the hopper, and the riding hopper $w$ resting on the periphery of the roller substantially as and for the purposes set forth.

4. The combination of a main hopper, a revoluble seed-dropping roller and a riding hopper $w$ resting on the roller and having apertures $w^7$ delivering seed to the roller and adjustable shutters $w^5$ to regulate the passage of seed therethrough as explained.

5. The combination of a main hopper having separate compartments $o, p$, the gravitating riding hopper $w$ having separate compartments communicating with those of the main hopper and a revoluble roller $d$ having a circumferential range of cavities communicating with one of the compartments of the riding hopper and a continuous circumferential groove communicating with the other compartment to adapt the machine for dropping seeds intermittently and continuously at the same time from the respective hopper-compartments, as explained.

6. In a seed-dropping roller $d$, the combination of a circumferential seed-dropping groove $x$ and a spiral feed-groove $x'$ communicating therewith and conducting seed thereto by the revolution of the roller, as explained.

7. In combination with a suitable hopper the roller $d$ having a continuous peripheral groove $x$ formed with a milled or roughened surface to insure uniform flow in the continuous dropping of seed, as explained.

8. In combination with a suitable hopper and a roller $d$ having a number of peripheral grooves or rows of holes for dropping seed, the bracket $y$ fitting adjustably within the hopper, resting on the roller and having a bottom face curved to conform to the periphery of the latter, for the purpose of covering and closing any groove or row of holes which is to be disused.

In testimony whereof I have signed this specification in the presence of two subscribing witnesses.

CHARLES BRISTOW.

Witnesses:
E. S. BALDWIN,
JERE L. BARRAND.